US011526838B1

(12) United States Patent
Sethuraman et al.

(10) Patent No.: US 11,526,838 B1
(45) Date of Patent: Dec. 13, 2022

(54) CAPACITY MANAGEMENT SYSTEM FOR DELIVERY LOCKERS

(71) Applicant: Amazon Technologies, Inc., Seattle, WA (US)

(72) Inventors: Samyukta Sethuraman, Folsom, CA (US); Setareh Mardan, Seattle, WA (US); Timothy Lee Jacobs, Tempe, AZ (US); Mehul Jain, New Delhi (IN); Ankur Bansal, New Delhi (IN)

(73) Assignee: Amazon Technologies, Inc., Seattle, WA (US)

( * ) Notice: Subject to any disclaimer, the term of this patent is extended or adjusted under 35 U.S.C. 154(b) by 224 days.

(21) Appl. No.: 16/561,493

(22) Filed: Sep. 5, 2019

Related U.S. Application Data

(60) Provisional application No. 62/857,011, filed on Jun. 4, 2019.

(51) Int. Cl.
*G06Q 10/08* (2012.01)
*G06N 20/00* (2019.01)

(52) U.S. Cl.
CPC ......... *G06Q 10/0838* (2013.01); *G06N 20/00* (2019.01); *G06Q 10/0833* (2013.01); *G06Q 10/0836* (2013.01)

(58) Field of Classification Search
CPC .......................... G06Q 10/08; G06Q 10/0836
See application file for complete search history.

(56) References Cited

U.S. PATENT DOCUMENTS

| 6,933,832 | B1 * | 8/2005 | Simms ............... G07F 17/12 340/5.73 |
| 9,052,992 | B2 * | 6/2015 | Irwin ............... G06F 17/00 |
| 9,195,950 | B2 * | 11/2015 | Schenken ........ G06Q 10/0836 |
| 2014/0279658 | A1 * | 9/2014 | Lievens .......... G06Q 10/06312 705/336 |

(Continued)

FOREIGN PATENT DOCUMENTS

| EP | 1921586 A1 * | 5/2008 | ............ G06Q 10/02 |
| JP | 2019144796 A * | 8/2019 | ............ G06Q 50/28 |
| KR | 102044151 B1 * | 11/2019 | ............ G06Q 50/10 |

OTHER PUBLICATIONS

Louis Faugere, Benoit Montreuil, Hyperconnected Pickup & Delivery Locker Networks, Jul. 6, 2017, 4th International Physical Internet Conference, Graz University of Technology, Austria, (Accessed on Jul. 10, 2022 via Research Gate). (Year: 2017).*

(Continued)

*Primary Examiner* — Emmett K. Walsh
*Assistant Examiner* — Larita L. Yusuf
(74) *Attorney, Agent, or Firm* — Lee & Hayes, P.C.

(57) ABSTRACT

Managing the capacity of delivery lockers are disclosed herein. For example, by utilizing machine learning techniques, the capacity management system described herein may determine portions of a delivery locker to reserve for packages delivered at one or more delivery speeds. For example, the system may train one or more machine learning models to determine factors associated with a delivery demand, dwell time probability, and optimized capacity reservation of the delivery locker. Utilizing these factors, the system may determine a portion of the delivery locker to reserve for packages delivered at each available delivery speed.

20 Claims, 6 Drawing Sheets

(56) References Cited

U.S. PATENT DOCUMENTS

| | | | | |
|---|---|---|---|---|
| 2015/0193731 A1* | 7/2015 | Stevens | ............... | G06Q 10/083 |
| | | | | 705/26.7 |
| 2018/0033079 A1* | 2/2018 | Porter | ............... | G06Q 10/0631 |
| 2018/0190062 A1* | 7/2018 | Robinson | ........... | G06Q 10/0838 |
| 2019/0205830 A1* | 7/2019 | O'Brien | ............ | G06Q 10/0836 |
| 2020/0051009 A1* | 2/2020 | Simms | .............. | G06Q 30/0222 |
| 2020/0175472 A1* | 6/2020 | Kaiser | ................ | G06Q 10/0834 |
| 2020/0250915 A1* | 8/2020 | Schachte | ................ | G07F 17/12 |
| 2020/0372458 A1* | 11/2020 | Kim | ................... | G06Q 10/0832 |
| 2021/0090007 A1* | 3/2021 | Yamaguchi | ............ | G06Q 10/04 |

OTHER PUBLICATIONS

Pan Huanwen, Lin Han, Research on Optimization of Intelligent Express Locker: In the Case of the Intelligent Express Locker in S University, Mar. 20, 2017, CSC Canada Management Science and Engineering, vol. 11, No. 1, 2017, pp. 23-30 (Year: 2017).*

* cited by examiner

Throughput Maximization

Maximize:
$$\sum_{t=1}^{T}\sum_{i=1}^{S} y_{i,t}$$

Subject to:

$$\sum_{i=1}^{S} y_{i,t} p_{i,t} + \sum_{m=t-q_i}^{0} y_{i,m} p_{i,m} \leq C_t \quad \forall t \in \{1,\ldots,T\}$$

$$y_{i,t} \leq c_{i,t} \quad \forall i \in \{1,\ldots,S\}, \, \forall t \in \{1,\ldots,T\}$$

$$\sum_{i=1}^{S} y_{i,t} p_{i,t} + \sum_{m=t-q_i}^{0} y_{i,m} p_{i,m} = r_{a,t} \quad \forall a \in \{1,\ldots,S\}, \, \forall t \in \{1,\ldots,T\}$$

$$y_{i,t} \geq 0, \, w_{i,t} \geq 0 \quad \forall a \in \{1,\ldots,S\}, \, \forall t \in \{1,\ldots,T\}$$

```
┌─────────────────────────────────────────────────────────────────────────────┐
│ DETERMINE, BY A MACHINE LEARNING MODEL, A DELIVERY DEMAND ASSOCIATED WITH A │
│                             DELIVERY LOCKER                                 │
│                                    602                                      │
└─────────────────────────────────────────────────────────────────────────────┘
                                      │
                                      ▼
┌─────────────────────────────────────────────────────────────────────────────┐
│ DETERMINE, BY THE MACHINE LEARNING MODEL, AN ESTIMATED DWELL TIME           │
│ PROBABILITY ASSOCIATED WITH ONE OR MORE PACKAGES                            │
│                                    604                                      │
└─────────────────────────────────────────────────────────────────────────────┘
                                      │
                                      ▼
┌─────────────────────────────────────────────────────────────────────────────┐
│ DETERMINE, BASED AT LEAST IN PART ON THE DELIVERY DEMAND AND THE ESTIMATED  │
│ DWELL TIME PROBABILITY, A PACKAGE CAPACITY RESERVATION INDICATING ONE OR    │
│ MORE PORTIONS OF THE DELIVERY LOCKER TO RESERVE FOR PACKAGES DELIVERED AT   │
│ INDIVIDUAL DELIVERY SPEEDS                                                  │
│                                    606                                      │
└─────────────────────────────────────────────────────────────────────────────┘
                                      │
                                      ▼
┌─────────────────────────────────────────────────────────────────────────────┐
│ RECEIVE A REQUEST TO DELIVER A PACKAGE TO THE DELIVERY LOCKER, THE REQUEST  │
│ INDICATING A SELECTED DELIVERY SPEED                                        │
│                                    608                                      │
└─────────────────────────────────────────────────────────────────────────────┘
                                      │
                                      ▼
                         ╱ CAN THE DELIVERY ╲
              Yes       ╱ LOCKER ACCOMMODATE ╲       No
         ┌─────────────╳     THE REQUEST?     ╳─────────────┐
         │              ╲        610         ╱              │
         │               ╲                  ╱               │
         ▼                                                  ▼
┌────────────────────────┐                    ┌────────────────────────────┐
│ GENERATE A USER        │                    │ DETERMINE AN ALTERNATIVE   │
│ INTERFACE ELEMENT      │                    │ DELIVERY LOCKER THAT CAN   │
│ INDICATING THAT THE    │──────────▶         │ ACCOMMODATE THE REQUEST    │
│ DELIVERY LOCKER CAN    │                    │            614             │
│ ACCOMMODATE THE        │                    └────────────────────────────┘
│ REQUEST                │                                  │
│           612          │                                  ▼
└────────────────────────┘                    ┌────────────────────────────┐
                                              │ GENERATE AN ADDITIONAL     │
                                              │ USER INTERFACE ELEMENT     │
                                              │ INDICATING THE ALTERNATIVE │
                                              │ DELIVERY LOCKER            │
                                              │            616             │
                                              └────────────────────────────┘
```

FIG. 6

CAPACITY MANAGEMENT SYSTEM FOR DELIVERY LOCKERS

CROSS-REFERENCE TO RELATED APPLICATION(S)

This application claims priority to U.S. Provisional Application No. 62/857,011, filed on Jun. 4, 2019 and entitled "Capacity Management System for Delivery Lockers," the entirety of which is incorporated herein by reference.

BACKGROUND

Conventional delivery systems for purchases typically allow a customer to have packages delivered directly to their home, a workplace, or a different delivery location specified by the customer. However, if a customer is not present when the package is delivered, the package may be left unattended or may be held at a carrier facility. Leaving packages unattended, such as on a doorstep, may lead to increased levels of loss or theft. Alternatively, having a carrier hold a package may lead to a timely and inconvenient pickup process, as carrier locations may be located far from the customer and may only be open at particular days/times. As delivery receptacles (e.g., delivery lockers) become more prevalent, delivery lockers may provide an alternative to home deliveries and/or carrier location pickups, allowing customers to have packages delivered to a convenient, secure location. However, inaccurate and inefficient management of the locker capacity of the delivery lockers may lead to unnecessary rejections of deliveries and unutilized space within the delivery lockers.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

FIG. 4 illustrates example equations for determining a capacity reservation for an example delivery locker.

FIG. 6 illustrates another example flow diagram corresponding to an example process of managing a capacity of a delivery locker.

DETAILED DESCRIPTION

Figure 1:
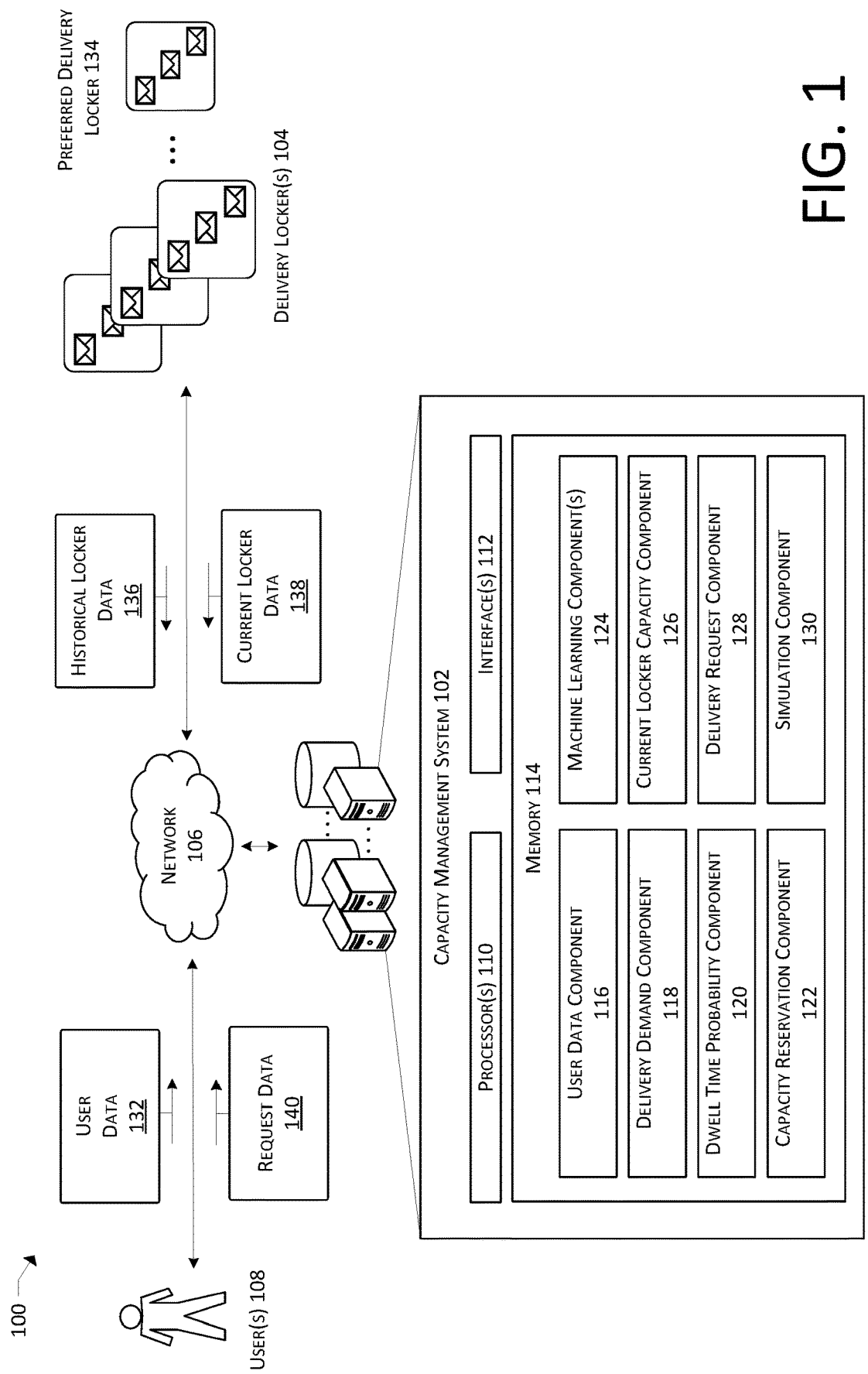
FIG. 1 illustrates an example environment for a capacity management system for delivery lockers.

Techniques described herein are directed to, in part, managing the capacity of delivery lockers that are configured to temporarily and securely store packages. By utilizing machine learning techniques, the capacity management system described herein may determine portions of a delivery locker to reserve for packages delivered at one or more delivery speeds. To provide an example, the system may train one or more machine learning models to determine factors associated with a delivery demand, dwell time probability, and/or optimized capacity reservation of the delivery locker. Utilizing these factors, the system may determine a portion of the delivery locker to reserve for packages delivered at each available delivery speed. As such, when a user purchases an item, the user may be given the option to select a delivery speed for the item (e.g., overnight, two-day, etc.). Depending on the selected delivery speed, the capacity management system may determine whether the user's preferred delivery locker can accommodate the request for delivery and storage of the package(s) that include the ordered item. In the event that the locker does not have the capacity to store the package, the system may determine, based on the factors and a location of the user, an alternative locker that has available capacity to accommodate the delivery request and at least temporarily store the package.

Existing techniques for managing the capacity of delivery lockers rely on predicting when a package will be delivered and predicting an occupancy of the locker at the time of delivery. Conventional techniques may also assign capacity reservations based solely, or primarily, on data associated with home deliveries. For example, for each locker, in each week, existing systems evaluate the proportion of packages delivered at different ship options (e.g., delivery speeds) to homes in the previous year, in the same week, in the zip-code of the locker. The capacity reservations for the locker are then assigned in equal proportions to the home deliveries, being normalized for locker capacity. Such techniques often lead to inaccurate reservations and unnecessary rejections (e.g., inaccurately indicating the inability to store packages when delivered due to no remaining capacity).

For example, the conventional techniques described above inaccurately assume that the same ratio of deliveries exists for both locker and home deliveries. Further, package dwell time probability (e.g., a probability associated with an amount of time packages will remain in the locker before being removed) is not considered. In particular, accounting for package dwell time probability creates a unique challenge, as traditional yield management techniques do not have to account for an unknown yield time of the product. Still further, locker throughput is not optimized/maximized. As such, the capacity reservations for shipping speeds that are determined using these conventional techniques are inaccurate and lead to inefficient capacity reservations and lowered customer satisfaction. For example, unjustified rejections may occur when the delivery locker may have capacity available, thus leading to customer frustration.

The capacity management techniques described herein help improve capacity reservation predictions and prevent unjustified rejections of packages. As such, the techniques described result in a more efficient use of locker space and increased customer satisfaction. For example, the techniques described herein utilize recent locker data along with home data, while conventional systems rely solely, or primarily, on older home data. As such, the techniques described herein provide more stable and accurate predictions regarding locker capacity management and a more efficient use of system resources. Further, the techniques described herein may rely on a lesser amount of data for a particular locker than conventional systems. For example, as the number of delivery lockers increases, issues may arise due to a lack of data to base predictions upon. In particular, when there is a lack of data associated with a delivery locker, the predictions made regarding the capacity management of the locker may be inaccurate and/or may not be able to be determined by conventional systems. As such, in situations where data is lacking for a particular locker, the techniques described herein may utilize data from other lockers to enable the system to make predictions and improve accuracy.

Still further, as described herein, the techniques described herein increase accuracy while utilizing smaller amounts of training data for some lockers (e.g., lockers with a lack of data), as well as utilizing a combination of more current training data and older training data. For example, the machine learning techniques described herein may train models using both older and more recent data. Further, the trained machine learning models may be utilized to make predictions for lockers having little to no associated data. Thus, as a result of the techniques described herein, increased accuracy and efficiency of locker throughput may be achieved utilizing the trained models. Still further, the trained machine learning models may be applied to groups of lockers (e.g., lockers having similar characteristics, such as the same zip code, same operating hours, etc.). In this way, predicted locker capacities can be determined for a group, rather than on an individual locker basis, thereby compensating for lack of data and/or utilizing less processing resources.

For example, the capacity management system described herein may utilize machine learning techniques to determine, or predict, a delivery demand associated with a delivery locker. The delivery demand may include an estimated number of packages to be delivered to the delivery locker at each shipping speed on each day during a predetermined time period (e.g., for the next seven days). For example, the system may utilize machine learning models, such as a random forest classification, as well as historical data associated with the delivery locker and other delivery lockers, to determine the delivery demand.

Additionally, the capacity management system may utilize the machine learning techniques to determine a package dwell time probability associated with one or more packages to be delivered to the delivery locker. The dwell time probability may include an estimated probability that the packages will remain in the locker for a certain period of time before they are removed (e.g., before the customer picks up the package or the package is returned to the sender). For example, based on historical data, the dwell time probability may be determined to indicate a probability that a package will remain in the locker for a certain number of days at each shipping speed on each day during a predetermined time period.

In examples, based on the estimated delivery demand and dwell time probability, the systems described herein may execute a linear programming formulation to determine a capacity reservation associated with the delivery locker. For example, the capacity reservation may indicate a portion of the locker to reserve for packages delivered at each shipping speed in order to maximize the throughput of packages through the delivery locker (e.g., to maximize the total number of packages delivered to the delivery locker during a period of time). In some examples, the delivery demand and dwell time probability may serve as variables, among others, in the linear programming formulation.

Based on the capacity reservation, the system may reserve portions of the delivery locker for packages delivered at individual shipping speeds. As such, based on the reservations, along with the tracking of the delivery locker's capacity, the system may determine whether the delivery locker can accommodate packages in response to a user request. For example, the system may receive a request to have a package delivered to the delivery locker at a shipping speed. In response, the system may utilize the capacity reservation, along with the actual or predicted current capacity of the delivery locker, to determine if the delivery locker can accommodate the user's packages at the selected shipping speed. For example, if the current capacity of that portion of the delivery locker indicates that the reservation capacity has not been met (e.g., that the portion currently has less than the maximum number packages in it or the percentage of space reserved has not been filled), then the system may indicate to the user that the package delivery request can be accommodated.

Alternatively, if the current capacity of the delivery locker indicates that the reservation capacity has been met (e.g., that the portion of the locker is full), the system may indicate that the delivery locker cannot accommodate the delivery request. Further, in some examples, the system may determine an alternative delivery locker that can accommodate the request and may provide an indication of the alternative locker to the user. When presenting alternative lockers, the system may further indicate which alternative lockers have capacity for individual ship options (e.g., allowing the user to choose a locker in closer proximity at a different ship option, and the like).

In this way, the capacity management system may utilize machine learning models, trained with limited data, to optimize the package throughout for each delivery locker. As such, fewer unjustified rejections will occur and customer satisfaction, as well as package security, may be increased.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details pertaining to the above-mentioned techniques are described below with reference to several example embodiments of FIGS. 1-6. It is to be appreciated that while these figures describe example environments and devices that may utilize the claimed techniques, the techniques may apply equally to other environments, devices, and the like.

FIG. 1 illustrates an example environment 100 for a capacity management system 102 of the present disclosure. The environment 100 may include, for example, the capacity management system 102 configured to determine a capacity reservation associated with one or more delivery lockers 104 indicating portions of the delivery locker(s) 104 to reserve for packages delivered at one or more shipping speeds. The capacity management system 102 may be further configured to receive delivery requests, via a network 106, from a user 108 to have a package delivered to one of the delivery lockers 104. Based on the capacity reservation, as well as a current capacity of the delivery locker(s) 104, the capacity management system 102 may determine whether the delivery locker(s) 104 can accommodate the delivery requests and at least temporarily store the package(s) for subsequent pick up.

It should be understood that, while FIG. 1 depicts one system 102, the environment 100 may include any number of systems configured to operate independently and/or in combination and configured to communicate with each other via the network 106. It should also be understood that while the object is described as a "system," the object may be considered a device. The components of the capacity management system 102 will be described in detail below.

For example, the capacity management system 102 may include one or more processors 110, one or more network interfaces 112, and memory 114. The memory 114 may include one or more components, such as, for example, a user data component 116, a delivery demand component 118, a dwell time probability component 120, a capacity reservation component 122, one or more machine learning components 124, a current locker capacity component 126, a delivery request component 128, and/or a simulation component 130. At least some of the components of the memory 114 will be described below.

The user data component 116 may be configured to store and/or access user data associated with one or more user(s) 102 utilizing the capacity management system 102. For example, the user data component 106 may be configured to store user data 132 provided by the user 108 and transmitted to the capacity management system 102 via the network 106. In particular, the user data 132 may include, but not be limited to, demographic data, address data, payment method data, items previously searched for, viewed, and/or purchased (e.g., a search history, an order history, items added to a saved-items list (e.g., a wish list)), a preferred delivery locker 134, and/or any other data provided by the user 108. For example, the preferred delivery locker 134 may include a selected delivery locker that the user 108 has chosen for a particular order, or that has been indicated by the user 108 previously, such as in the user's 102 user profile. The preferred delivery locker 134 may also include a delivery locker 104 that has previously stored one or more packages that included items ordered by the user 108. The user data component 116 may also store user data 132 not explicitly provided by the user 108, but that is inferred about the user 108 and/or determined by the capacity management system 102 based on historical user data, user activity, transaction history, and the like.

In examples, the user data 132 may be transmitted to the capacity management system 102 via the network 106 from the user 108. In other examples, the user data 132 may be accessed from an external storage component, such as a database or cloud-based storage device, by the capacity management system 102. The user data 132 may be utilized by the capacity management system 102 to predict, or determine, whether the preferred delivery locker 134 can accommodate a package delivery request from the user 108, as described herein.

The delivery demand component 118 may be configured to utilize the one or more machine learning components 124 to determine an estimated delivery demand associated with the delivery locker(s) 104, such as the preferred delivery locker 134. For example, the delivery demand component 118 may be configured to receive and/or access historical locker data 136 associated with the preferred delivery locker 134. For example, the historical locker data 136 may include data associated with locker deliveries to the preferred delivery locker 134 over a predetermined period of time, such as a previous number of weeks or months. The data may include a number of packages delivered at each shipping speed, on each day of the predetermined period of time.

In some examples, the historical locker data 136 may include data associated with one or more additional delivery lockers 104. For example, if the historical locker data 136 is limited for the preferred delivery locker 134, the delivery demand component 118 may utilize historical locker data 136 for the additional delivery lockers 104.

The delivery demand component 118 may further utilize historical data associated with home deliveries (or deliveries to other locations, such as workplaces) in the same zip code as the preferred delivery locker 134 and/or the additional delivery lockers 104. For example, the home delivery data may include home deliveries occurring during the same predetermined period of time in the past, such as in the previous year. In this way, the delivery demand component 118 can account for demand fluctuations due to peak delivery times and/or changes due to seasonality. Utilizing this historical information, the one or more machine learning components 124 may train models of the machine learning component(s) 124, such as a random forest classification, for the delivery demand component 118 to utilize to predict an expected number of packages of each shipping speed to be delivered to the preferred delivery locker 134 on each day in the future, such as on each day over the next week, month, and the like.

The memory may further be configured to store the dwell time probability component 120. The dwell time probability component 120 may be configured to utilize the machine learning component(s) 124 to determine the dwell time probability of a package, or the probability of a package of individual delivery speeds on individual delivery days remaining in the preferred delivery locker 134 for a period of time, such as a number of days. That is, the dwell time probability may correspond to a predicted amount of time that a package will remain within a delivery locker 104 prior to a user 108 picking up the package or the package being returned to a sender of the package. This predicted amount of time may be based on the shipping speed (e.g., overnight, one-day, two-day, standard mail, etc.). In some examples, the dwell time probability component 120 utilizes a random forest classification of the machine learning component(s) 124 to predict the dwell time probability for the package.

For example, the machine learning component(s) 124 may be trained using the historical locker data 136. The dwell time probability component 120 may be configured to receive and/or access the historical locker data 136. For example, the historical locker data 136 may include a historical dwell time for packages delivered at individual shipping speeds on individual days of the week during a previous period of time, such as a previous number of weeks, number of months, and the like. In some examples, the historical locker data 136 may include locker data associated with the preferred delivery locker 134 and/or one or more delivery locker(s) 104. For example, if data is limited for the preferred delivery locker 134, the historical locker data 136 for the additional delivery lockers 104 may be accessed and/or received. Utilizing the historical locker data 136, as well as the trained machine learning component(s) 124, the dwell time probability component 120 may estimate the probability that a package delivered at an individual shipping speed will remain in the preferred delivery locker 134 for a given number of days, such as zero days, one day, and the like, on a particular delivery day.

In examples, the capacity reservation component 122 may be configured to determine optimized capacity reservations for each ship option of the preferred delivery locker 134. For example, the capacity reservation component 122 may be configured to receive and/or access the predicted delivery demand from the delivery demand component 118, as well as the predicted dwell time probability from the dwell time probability component 120, to utilize as variables for determining a capacity reservation for each ship option of the preferred delivery locker 134.

For example, the capacity reservation component 122 may execute a linear programming formulation, as depicted and described with reference to FIG. 3, to determine optimized capacity reservations. In examples, the linear program is run at the end of each day for a predetermined period of time, such as days zero to seven. Utilizing multiple parameters and decision variables, such as variables corresponding to the delivery demand and dwell time probability, the formulation may determine capacity reservations configured to optimize, or maximize, throughout to the preferred delivery locker 134.

In examples, the capacity management system 102 may be configured to store the current locker capacity component 126. For example, the current locker capacity component 126 may be configured to request and/or access current locker data 138 of the preferred delivery locker 134 and/or one or more additional delivery lockers 104. The current locker data 138 may include, for example, an actual number of packages currently being stored in the preferred delivery locker 134 at each shipping speed. Alternatively, or in addition, the current locker capacity component 136 may be configured to predict a probabilistic future capacity of the preferred delivery locker 134 and/or one or more additional delivery lockers 104. In examples, the probabilistic future capacity may reflect a predicted number of packages that will be in the preferred delivery locker 134 on the day that the package requested by the user 108 is scheduled to arrive, according to the shipping speed selected by the user 108, as well as a probability that the package will arrive as scheduled.

For example, the current locker capacity component 126 may be configured to receive and/or access the historical locker data 136, including historical package arrival times for packages delivered to the preferred delivery locker 134 and/or one or more additional delivery lockers 104 during a previous period of time. For instance, in some examples, packages may not arrive on the day associated with the shipping speed (e.g., the packages may be delayed, lost, etc.). As such, the historical locker data 136 may indicate the actual arrival date of individual packages shipped at individual shipping speeds. Utilizing the historical locker data 136, the current locker capacity component 126 may predict a probabilistic future capacity of the preferred delivery locker 134 that indicates a probability that a number of packages delivered according to individual shipping speeds will be in the preferred delivery locker 134 on the day that the package requested by the user 108 is scheduled to arrive, as well as a probability that the requested package will arrive according to the shipping speed selected by the user 108.

For example, if the request data 140 indicates that the user 108 has requested that the package is delivered according to a two-day shipping speed, the current locker capacity component 126 may utilize the historical locker data 136 to determine a probability that the requested package will actually arrive within the two-days. Further, the current locker capacity component 126 may utilize the historical locker data 136 to determine a probability that a number of packages will be in the preferred delivery locker 134 on the predicted arrival day of the requested package (e.g., a probability that two, three, four, etc. packages, previously ordered by the user 108 and/or additional users, and shipped at the two-day shipping speed, will be in the preferred delivery locker 134 on the day that the package is predicted to arrive).

In addition, the current locker capacity component 126 may be configured to determine the predicted current locker capacity in light of a predicted dwell time probability associated with the packages predicted to be in the preferred delivery locker 134 on the day that the requested package is predicted to arrive. In examples, the predicted dwell time probability may take into account historical order data including price, origin of package, customer type (e.g., users having premium subscriptions), product group, and/or opening and closing times associated with the preferred delivery locker 134 and/or additional delivery locker(s) 104. Utilizing this historical order data, the current locker capacity component 126 may predict a dwell time probability in association with packages predicted to be delivered within the delivery window of the package requested by the user 108. In this way, the predicted current locker capacity can be determined with increased accuracy.

In examples, the current locker capacity component 126 may utilize the trained models of the machine learning component(s) 124 to determine the predicted delivery date of the requested package and/or the predicted current locker capacity. In still further examples, the current locker capacity component 126 may be configured to account for disruptions in the locker service (e.g., that the preferred delivery locker 134 is broken, malfunctioning, or otherwise not accepting deliveries) or has previously been reserved (e.g., has been reserved according to previous orders by other users). As such, the current locker capacity component 126 may utilize data such as the current locker data 138, historical locker data 136, request data 140, and the like, to determine an actual or predicted current capacity of each portion of the preferred delivery locker 134 corresponding to each ship option at a given time on a given day. In this way, the capacity management system 102 may determine whether the portion of the preferred delivery locker 134 is full and/or whether the portion of the preferred delivery locker 134 can accommodate additional packages.

The capacity management system 102 may further be configured to store the delivery request component 128 to receive delivery requests from the user 108. For example, the delivery request component 128 of the capacity management system 102 may be configured to receive, access, and/or store request data 140 including information relating to a delivery request of the user 108. The request data 140 may include information associated with an order of the user 108 including one or more packages requested to be delivered to the preferred delivery locker 134. Additionally, the request data 140 may include a selected shipping speed that the user 108 has selected for (and/or that was assigned to) each package included in the order.

In examples, the delivery request component 128 may be configured to respond to the request(s) of the user 108. For example, the delivery request component 128 may be configured to receive and/or access data from the current locker capacity component 126 and/or the capacity reservation component 122 to determine whether the preferred delivery locker 134 can accommodate the delivery request of the user 108. For example, the delivery request component 128 may analyze the request data 140 to determine a number of packages at shipping speeds that the user 108 is requesting to be delivered to the preferred delivery locker 134. Utilizing the data from the capacity reservation component 122 indicating a capacity reservation for each ship option of the preferred delivery locker 134, along with the data from the current locker capacity component 126 indicating the current number of packages at each shipping speed that are in the preferred delivery locker 134, the delivery request component 128 may determine whether the preferred delivery locker 134 can accommodate the user's 102 delivery request.

In examples where the preferred delivery locker component 132 cannot accommodate the delivery request, the delivery request component 128 may further be configured to determine an alternative delivery locker from the additional delivery lockers 104 that can accommodate the request. For example, the delivery request component 128 may be configured to utilize data from the capacity reservation component 122 indicating a capacity reservation for each ship option of the additional delivery lockers 104, along with the data from the current locker capacity component 126 indicating the actual and/or predicted number of packages at each shipping speed that are in the additional delivery lockers 104 or predicted to be in the additional delivery lockers 104, to determine an alternative delivery locker that can accommodate the user's 102 delivery request.

In examples, the delivery request component 128 may determine the alternative delivery locker according to the groupings of delivery lockers. As described herein, delivery lockers may be grouped according to shared characteristics (e.g., a shared location, shared zip code, shared operating hours, etc.). In this way, the techniques described herein may be applied to a group of lockers, rather than to an individual delivery locker, such as the preferred delivery locker 134. In this way, the delivery request component 128 may determine the alternative delivery locker by first analyzing the lockers in the same group as the preferred delivery locker 134. In this way, the system may analyze fewer delivery lockers for an availability to accommodate the delivery request.

In examples, the preferred delivery locker component 132 may further be configured to generate one or more user interfaces for display on a user device (not shown) of the user 108. The one or more user interfaces may include one or more user interface elements indicating whether the preferred delivery locker 134 can accommodate the delivery request, the alternative delivery locker information, and or one or more selectable elements to allow the user 108 to select the alternative delivery locker. The one or more user interfaces may be displayed via a display component of the user device while the user 108 is placing the request.

In examples, the memory 114 may further be configured to store the simulation component 130. The simulation component 130 may be configured to simulate and/or track the performance of the various predictions/determinations of the capacity management system 102. For example, capacity reservations determined by the capacity reservation component 122 may be simulated by the simulation component 130 to determine accuracy and/or changes to the current throughput of the preferred delivery locker 134 and/or the additional delivery lockers 104. In examples, the capacity reservations may be tested on a variety of lockers having various throughput levels for a predetermined period of time.

For example, the simulation component 130 may be configured to receive and/or access the historical locker data 132 stored by the various components of the capacity management system 102 to obtain historical delivery requests associated with the preferred delivery locker 134 and/or one or more additional delivery lockers 104. The historical delivery requests may be replayed using both the original reservation settings and the capacity reservations determined by the capacity reservation component 122. In this way, the simulation component 130 may determine the number of requests that were accepted and denied using both reservations. As such, the simulation component 130 may determine whether the capacity reservations result in an improvement of throughput of packages.

In some examples, the capacity reservations may be simulated in a first group of delivery lockers, while a second group of delivery lockers exhibiting similar patterns to the first group is treated as a control group (e.g., the capacity reservations are not applied). In this way, the system may monitor changes in the throughput of the two groups to determine changes. The groupings may increase in size to determine additional changes and/or levels of improvement.

Still further, in examples, the memory 114 may be configured to store one or more machine learning components 124. As described herein, the machine learning component(s) 124 may be configured to determine the delivery demand and/or dwell time probability associated with the preferred delivery locker 134 and/or the additional delivery locker(s) 104. The machine learning component(s) 124 may include one or more models, trainable by the data and components described herein, such as a decision-tree trained model. However, the machine learning component(s) 124 may execute any type of supervised learning algorithms (e.g., nearest neighbor, Naïve Bayes, Neural Networks, unsupervised learning algorithms, semi-supervised learning algorithms, reinforcement learning algorithms, and so forth).

For example, the machine learning component(s) 124 may execute one or more algorithms (e.g., decision trees, artificial neural networks, association rule learning, or any other machine learning algorithm) to train capacity management models that determine, based at least in part on various data, an estimated delivery demand associated with a delivery locker, dwell time probability of a package, and the like. Information from stored and/or accessible data may be extracted from one or more components and/or databases of the capacity management system 102 and may be utilized to predict trends and patterns. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome. Then, data may be collected and/or accessed to be used for analysis.

As used herein, a processor, such as processor 110, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor 110 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, at least some of the processor(s) 110 may possess its own local memory, which also may store program components, program data, and/or one or more operating systems.

The memory 114 may include volatile and nonvolatile memory, removable and non-removable media implemented in any method or technology for storage of information, such as computer-readable instructions, data structures, program component, or other data. Such memory 114 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 114 may be implemented as computer-readable storage media ("CRSM"), which may be any available physical media accessible by the processor(s) 110 to execute instructions stored on the memory 114. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 114, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) 112 may enable communications between the components and/or devices shown in environment 100 and/or with one or more other remote systems, as well as other networked devices. Such network interface(s) 112 may include one or more network interface controllers (NICs) or other types of transceiver devices to send and receive communications over the network 106.

For instance, at least some of the network interface(s) 112 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, at least some of the network interface(s) 112 may include a wide area network (WAN) component to enable communication over a wide area network.

Figure 2:
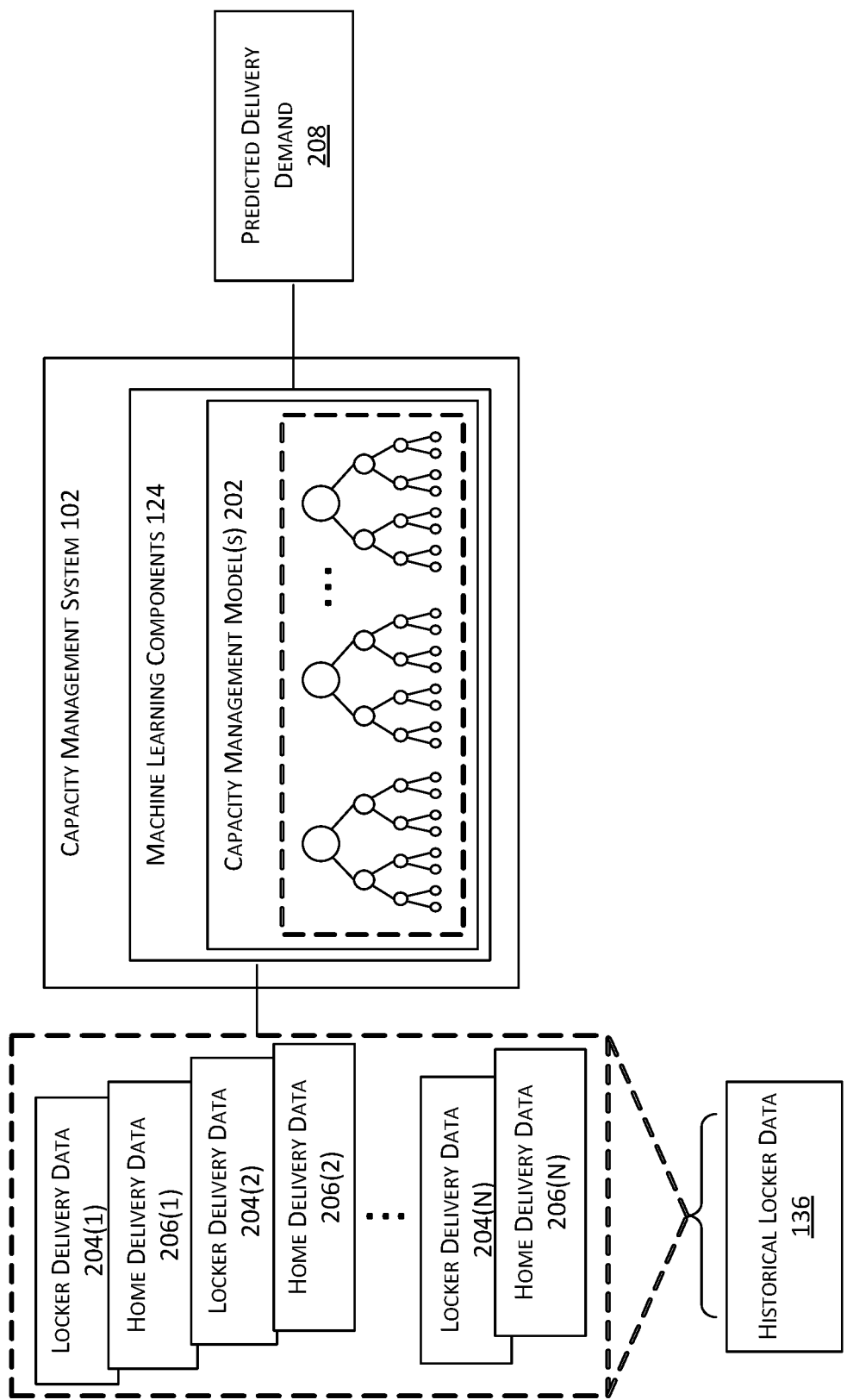
FIG. 2 illustrates an example of generating and/or training a capacity management model used to determine and manage a capacity of delivery lockers.

FIG. 2 illustrates an example of generating and/or training a capacity management model 202 of the present disclosure. For example, the one or more machine learning components 124 of the capacity management system 102, depicted and described in FIG. 1, may receive and/or access historical locker data 136 from one or more components of the capacity management system 102, such as delivery demand component 118. In examples, the historical locker data 136 may include historical data associated with multiple delivery lockers, such as the preferred delivery locker 134 and/or one or more additional delivery lockers 104.

For example, as described herein, if limited data is available for the preferred delivery locker 134, data from one or more additional delivery lockers 104 may be used to train the capacity management models 202 and to determine the estimated delivery demand and/or dwell time probability of the preferred delivery locker 134. In some examples, the additional delivery locker(s) 104 may include one or more delivery lockers 104 that exhibit similar throughput patterns and/or have similar characteristics as the preferred delivery locker 134 (e.g., have the same zip code).

In examples, the historical locker data 136 may include data associated with locker deliveries to the preferred delivery locker 134 and/or the additional locker(s) 104 over a predetermined period of time, such as a previous number of weeks or months. The data may include a number of packages delivered at each shipping speed, on each day of the predetermined period of time (e.g., locker delivery data 204(1), locker delivery data 204(2), . . . locker delivery data 204(N), of the capacity management system 102).

In examples, the historical locker data 136 may further include data associated with home deliveries (or deliveries to locations other than a delivery locker 104) in the same zip code as the delivery locker 104 during a past period of time corresponding to the predetermined period of time, such as the same week of the previous year (e.g., home delivery data 206(1), home delivery data 206(2), . . . home delivery data 206(N), of the capacity management system 102. By taking into account the home delivery data of a previous period of time, the capacity management model(s) 202 may take into account seasonality in demand, such as fluctuations that occur during peak delivery times.

In examples, the capacity management model(s) 202 of the one or more machine learning components 124, utilized by the delivery demand component 118, may be trained utilizing the historical locker data 136 and/or the home delivery data. For example, the capacity management model(s) 202 may include a random forest classification that is used to determine the predicted delivery demand 208. For example, the capacity management model(s) 202 may utilize the locker delivery data 204 and the home delivery data 206 to predict a delivery demand for a locker, such as the preferred delivery locker 134, indicating a predicted number of packages of each ship option to be delivered to the preferred delivery locker 134 on each day for a predetermined period of time, such as over the subsequent week. Note that, although the capacity management model(s) 202 are illustrated as a decision-tree trained model of a random forest classification, the machine learning component(s) 124 may execute any type of supervised learning algorithms (e.g., nearest neighbor, Naïve Bayes, Neural Networks, unsupervised learning algorithms, semi-supervised learning algorithms, reinforcement learning algorithms, and so forth).

Utilizing the capacity management model(s) 202 of the machine learning component(s) 124, the delivery demand component 118 may utilize a specific data subset of the historical locker data 136 and/or the home delivery data to determine the predicted delivery demand 208. For example, the training data utilized to train the capacity management model(s) 202 may include a longer period of data than that utilized by the delivery demand component 118. For example, the capacity management model(s) 202 may be trained using a period of sixteen weeks of historical locker data 136 before the model run data, along with four weeks of historical locker data 136 from a peak delivery period of the previous year. Utilizing the trained capacity management model(s), the delivery demand component 118 may utilize a smaller subset of data, such as the historical delivery data 134 for a ship option on a certain day of the week of the previous four weeks. Further, the delivery demand component 118 may utilize home deliveries in the same zip code as the preferred delivery locker 134 in the same week of the previous year (e.g., to account for seasonality fluctuations), the time of a first rejection for a ship option (e.g., to account for unseen demand), a delivery day of the week, a delivery day of the month, and a ship option. Utilizing this subset of data, as well as the other data factors, the delivery demand component 118 may utilize the capacity management model(s) to determine the predicted delivery demand 208.

In examples, to determine a performance and/or predicted accuracy of the capacity management model(s) 202, simulated throughput values (e.g., as determined by the simulation component 130 of the capacity management system 102) may be compared with the throughput of the preferred delivery locker 134 and/or a similar delivery locker to determine throughput performance (e.g., the total number of packages delivered to the delivery locker during a period of time). By using locker throughput as the performance metric, the performance and/or accuracy of the capacity management model(s) 202 may be determined with improved stability and degrees of change may be determined with greater accuracy.

Figure 3:
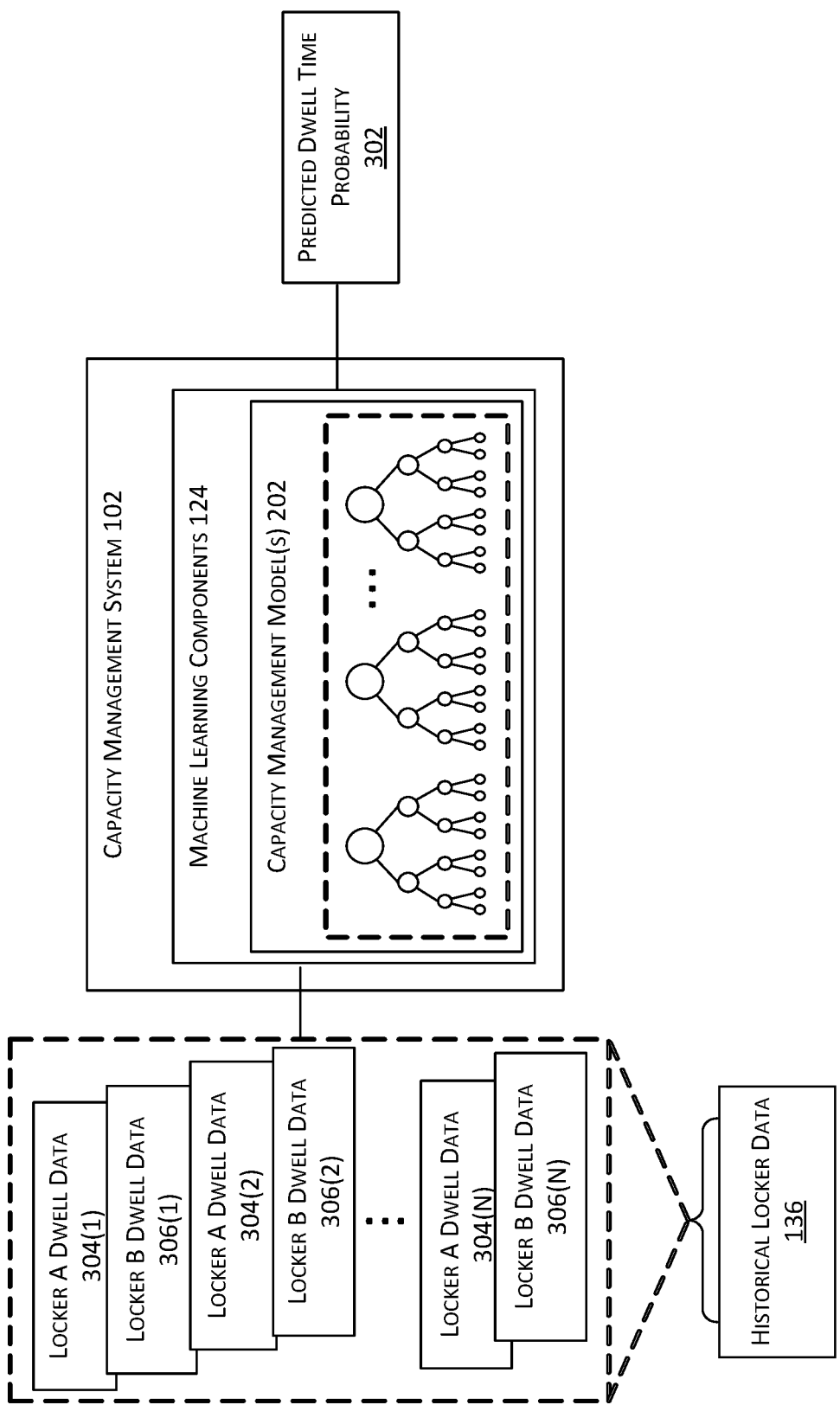
FIG. 3 illustrates another example of generating and/or training a capacity management model used to determine and manage a capacity of delivery lockers.

FIG. 3 illustrates another example of generating and/or training a capacity management model 202 of the present disclosure. The capacity management model 202 may then be utilized by the dwell time probability component 120 to determine a predicted dwell time probability 302 indicating an estimated probability that a package to be delivered to the preferred delivery locker 134 will remain in the locker for a number of days. For example, the predicted dwell time probability 302 may indicate a probability that the package delivered at an individual shipping speed and delivery day in the next seven days will remain in the preferred delivery locker 134 for zero, one, two, three, four, five, or six days.

In examples, the one or more machine learning components 124 of the capacity management system 102, depicted and described in FIG. 1, may receive and/or access historical locker data 136 from one or more components of the capacity management system 102, such as dwell time probability component 120, indicating historical dwell times of one or more delivery lockers. In examples, the historical locker data 136 may include historical data associated with multiple delivery lockers, such as the preferred delivery locker 134 and/or one or more additional delivery lockers 104 (e.g., as indicated by the terms "Locker A" and "Locker B," respectively).

For example, as described herein, if limited data is available for the preferred delivery locker 134, data from one or more additional delivery lockers 104 may be used to train the capacity management models 202 and to determine the predicted dwell time probability 306 of a package to be delivered to the preferred delivery locker 134. In some examples, the additional delivery locker(s) 104 may include one or more delivery lockers 104 that exhibit similar throughput patterns and/or have similar characteristics as the preferred delivery locker 134 (e.g., have the same zip code).

The historical locker data 136 may include a historical dwell time for packages delivered to the preferred delivery locker 134 and/or the additional locker(s) 104 at individual shipping speeds on individual days of the week during a previous period of time, such as a previous number of weeks, number of months, and the like (e.g., locker A dwell data 304(1), locker B dwell data 306(1), locker A dwell data 304(2), locker B dwell data 306(2), . . . locker A dwell data 304(N), locker B dwell data 306(N), of the capacity management system 102). In examples, the training dwell data may include an average, minimum, and maximum dwell time probability for packages delivered at individual shipping speeds, delivered on a certain day of the week for the previous four weeks.

In examples, packages delivered to the preferred delivery locker 134, and/or additional delivery locker(s) 104, must be retrieved by the user 108 within a certain period of time, such as three days. If the package has not been removed from the preferred delivery locker 134 within the required time period, a call tag for the package will be generated by the capacity management system 102 indicating that the package is to be returned to the sender. For example, the call tag may be generated and the carrier may pick up the package to return to the sender within an additional period of time, such as within the next two days. Thus, the possible values for the predicted dwell time probability 302 associated with a package include values ranging from zero to six days. For example, as described herein, the predicted dwell time probability 302 may indicate a probability that the package delivered at an individual shipping speed and delivery day in the next seven days will remain in the preferred delivery locker 134 for zero, one, two, three, four, five, or six days.

In examples, the dwell time probability component 120 may utilize the capacity management model(s) 202 of the one or more machine learning components 124, trained by the historical locker data 136 for the preferred delivery locker 134 and/or the additional delivery locker(s) 102 to determine the predicted dwell time probability 302. For example, the capacity management model(s) 202 may include a random forest classification that is used to determine the predicted dwell time probability 302. In examples the capacity management model(s) 202 may utilize the locker A dwell data 304 and the locker B dwell data 306 (e.g., the average, minimum, and maximum dwell time for of packages delivered at a shipping speed and delivered on that day for a previous number of weeks), along with other data such as the ship option selected by the user 108 (e.g., the ship option indicated in the request data 140), the delivery day of the week of the package, and the delivery day of the of the package to predict a dwell time probability for a package to be delivered to a delivery locker, such as the preferred delivery locker 134, at a ship option. Note that, although the capacity management model(s) 202 are illustrated as a decision-tree trained model of a random forest classification, the machine learning component(s) 124 may execute any type of supervised learning algorithms (e.g., nearest neighbor, Naïve Bayes, Neural Networks, unsupervised learning algorithms, semi-supervised learning algorithms, reinforcement learning algorithms, and so forth).

In examples, to improve the predicted dwell time probability 302, the dwell time probability component 120 may further utilize a probability calibration, such as an isotonic regression implemented in the scikit-learn python library. Further, the quality of the predicted dwell time probability 302 may be measured as a log loss function, indicating a measure of the level of confidence in the predicted dwell time probability 302. Also, in some examples, to determine a performance and/or predicted accuracy of the capacity management model(s) 202, simulated throughput values (e.g., as determined by the simulation component 130 of the capacity management system 102) may be compared with the throughput of the preferred delivery locker 134 and/or a similar delivery locker to determine throughput performance. By using locker throughput as the performance metric, the performance and/or accuracy of the capacity management model(s) 202 may be determined with improved stability and degrees of change may be determined with greater accuracy.

FIG. 4 illustrates example equations for determining a capacity reservation for an example delivery locker of the present disclosure. For example, as described herein with respect to FIG. 1, the capacity reservation component 122 may determine a capacity reservation for one or more portions of a delivery locker, such as the preferred delivery locker 134 and/or the additional delivery lockers 104. For example, the capacity reservation component 122 may implement a linear programming formulation 400 to optimize the capacity reservations of the preferred delivery locker 134 to maximize throughout (e.g., to maximize the total number of packages delivered to the delivery locker during a period of time).

In examples, the linear programming formulation 400 is run at the end of a day zero, where the time horizon is assumed to be the next seven days, with a count starting with day one. Further, based on the required pickup time associated with the preferred delivery locker 134 (e.g., the time period during which the user 108 must remove the package from the preferred delivery locker 134 before a call tag is generated to have the package returned to the sender) and the carrier pickup requirements, the linear programming formulation 400 may assume that packages delivered to the preferred delivery locker 134 up to six days before the first day of the time horizon may still be in the locker at the end of day zero. The actual and/or predicted number of packages in the preferred delivery locker 134 may be indicated by the current locker data 138 and determined by the current locker capacity component 126 of the capacity management system 102. However, the date on which the package will be removed is unknown, and may be estimated using the predicted dwell time probability 302 determined as described in FIG. 3.

The linear programming formulation 400 may include various indices, parameters, variables, and equations. For example, the indices may include:

$v \in \{-6, -5, \ldots T\}$, where T is the number of clays in the time horizon $t \in \{1, \ldots T\}$ $s \in \{1, \ldots S\}$, is the number of ship options Further, the parameters may include:

C: Locker capacity $p_{svt}$: Probability of a package delivered for ship option s on day $v \in \{-6, -5, \ldots t\}$ being present in the locker on day $t \in \{1, \ldots T\}$ $e_{sv}$: Number of packages of ship option s delivered to locker on day $v \in \{-6, -5, \ldots 0\}$ and present in the locker at the end of day 0

$d_{st}$: demand for package deliveries of ship option s on day $t \in \{1, \ldots T\}$ Still further, the decision variables may include:

$x_{st}$: Number of slots to reserve for ship option s on day $t \in \{1, \ldots T\}$ $y_{st}$: Number of packages accepted for arrival for ship option s on day $t \in \{1, \ldots T\}$ As such, the resulting linear programming formulation 400 may include: maximize $$\sum_{t=1}^{T} \sum_{s=1}^{S} y_{st} \tag{1}$$

subject to $$\sum_{v=1}^{t} \sum_{s=1}^{S} y_{sv} p_{svt} + \sum_{v=-6}^{0} \sum_{s=1}^{S} e_{sv} p_{svt} \leq C, \forall t \in \{1, \ldots, T\} \tag{2}$$

$$y_{st} \leq d_{st}, \forall s \in \{1, \ldots, S\}, \forall t \in \{1, \ldots, T\} \tag{3}$$

$$\sum_{v=1}^{t} y_{sv} p_{svt} + \sum_{v=-6}^{0} e_{sv} p_{svt} = x_{st}, \forall s \in \{1, \ldots, S\}, \forall t \in \{1, \ldots, T\} \tag{4}$$

$$x_{st} \geq 0; y_{st} \geq 0, \forall s \in \{1, \ldots, S\}, \forall t \in \{1, \ldots T\}. \tag{5}$$

In examples, constraint (2) of the linear programming formulation 400 is the capacity constraint at the locker, or the predicted delivery demand 208. Further, constraint (3) ensures that the number of packages accepted for delivery is less than or equal to predicted delivery demand 208. Still further, constraint (4) defines the relationship between the number of packages accepted for delivery and the number of slots, or portion of the preferred delivery locker 134, reserved for the ship option. Decision variables $x_{st}$ in the linear programming formulation 400 are used as capacity reservations for ship option $s \in \{1, \ldots, S\}$ and the day of time horizon $t \in \{1, \ldots T\}$.

In examples of the linear programming formulation 400, faster ship option packages are not prioritized using specific weight parameters. However, since the average dwell time probability of faster ship option packages may be lower than that of packages shipped at slower ship options, the objective of throughput maximization automatically results in prioritization of faster ship option packages. In further examples, cost optimization may also be taken into account in the linear programming formulation 400 described herein. For example, the linear programming formulation 400 may be modified to take into account cost minimization and profit maximizing parameters in addition, or alternatively, to maximizing locker throughput.

As described herein and shown above, the linear programming formulation 400 may be utilized by the capacity reservation component 122 of the capacity management system 102 to determine optimized capacity reservations for each shipping option of the preferred delivery locker 134. For example, as shown, the capacity reservation component 122 may be configured to receive and/or access the predicted delivery demand from the delivery demand component 118, as well as the predicted dwell time probability from the dwell time probability component 120, to utilize as variables for determining a capacity reservation for each shipping option of the preferred delivery locker 134. As such, the linear programming formulation 400 may determine capacity reservations configured to optimize, or maximize, throughout to the preferred delivery locker 134.

Figure 5:
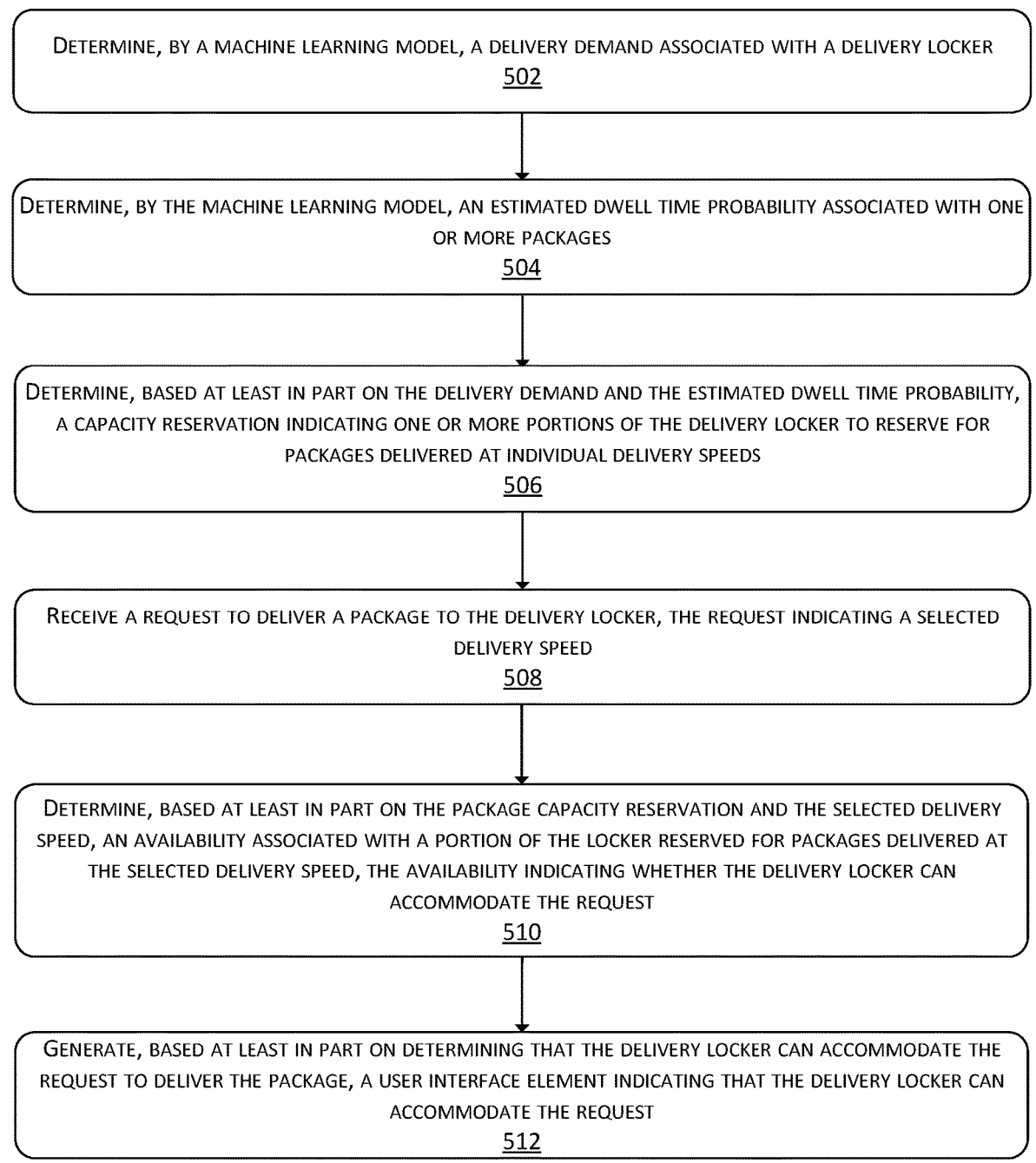
FIG. 5 illustrates an example flow diagram corresponding to an example process of managing a capacity of a delivery locker.

FIG. 5 illustrates an example flow diagram corresponding to an example method of the present disclosure. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-4, although the processes may be implemented in a wide variety of other environments, architectures, and systems.

FIG. 5 illustrates a flow diagram of an example process 500 for a capacity management system. The order in which the operations or steps are described is not intended to be construed as a limitation, and any number of the described operations may be combined in any order and/or in parallel to implement process 500.

At block 502, the process 500 may include determining, by a machine learning model, a delivery demand associated with a delivery locker. For example, as described with respect to FIGS. 1 and 2, the delivery demand component 118 may be configured to utilize the capacity management model(s) 202 to determine the predicted delivery demand 208. Further, the delivery demand component 118 may utilize home deliveries in the same zip code as the preferred delivery locker 134 in the same week of the previous year (e.g., to account for seasonality fluctuations), the time of a first rejection for a ship option (e.g., to account for unseen demand), a delivery day of the week, a delivery day of the month, and a ship option. The predicted delivery demand may include an estimated number of packages to be delivered to a delivery locker, such as the preferred delivery locker 134, at individual shipping speeds, on each day of a predetermined period of time, such as the following week.

In examples, the capacity management model(s) 202 may be trained using historical locker data 136 of the preferred delivery locker 134 and/or one or more additional delivery locker(s) 104 and/or historical home delivery data 206. For example, the capacity management model(s) 202 is illustrated as a decision-tree trained model of a random forest classification. However, the machine learning component(s) 124 may execute any type of supervised learning algorithms (e.g., nearest neighbor, Naïve Bayes, Neural Networks, unsupervised learning algorithms, semi-supervised learning algorithms, reinforcement learning algorithms, and so forth).

At block 504, the process 500 may include determining, by the machine learning model, an estimated dwell time probability associated with the one or more packages. For example, as described with respect to FIGS. 1-3, the dwell time probability component 120 may be configured to utilize the capacity management model(s) 202 to determine the predicted dwell time probability 302 associated with a package. In examples, the predicted dwell time probability 302 may indicate an estimated probability that a package to be delivered to a delivery locker, such as the preferred delivery locker 134, will remain in the locker for a certain number of days. For example, the predicted dwell time probability 302 may indicate a probability that the package delivered at an individual shipping speed and delivery day in the next seven days will remain in the preferred delivery locker 134 for zero, one, two, three, four, five, or six days.

In examples the capacity management model(s) 202 may be trained utilizing the historical locker data 136, including historical data associated with multiple delivery lockers, such as the preferred delivery locker 134 and/or one or more additional delivery lockers 104. The historical locker data 136 may include a historical dwell time for packages delivered to the preferred delivery locker 134 and/or the additional locker(s) 104 at individual shipping speeds on individual days of the week during a previous period of time, such as a previous number of weeks, number of months, and the like (e.g., the average, minimum, and maximum dwell time for of packages delivered at a shipping speed and delivered on that day for a previous number of weeks). The dwell time probability component 120 may utilize the capacity management model(s) 202, along with other data such as the ship option selected by the user 108 (e.g., the ship option indicated in the request data 140), the delivery day of the week of the package, and the delivery day of the of the package to predict a dwell time probability for a package to be delivered to a delivery locker, such as the preferred delivery locker 134, at a ship option.

At block 506, the process 500 may include determining, based at least in part on the delivery demand and the estimated dwell time probability, a capacity reservation indicating one or more portions of the delivery locker to reserve for packages delivered at individual delivery speeds. For example, as described herein with respect to FIGS. 1-4, the capacity reservation component 122 may determine a capacity reservation for one or more portions of a delivery locker, such as the preferred delivery locker 134 and/or the additional delivery lockers 104. For example, the capacity reservation component 122 may implement a linear programming formulation 400 to optimize the capacity reservations of the preferred delivery locker 134 to maximize throughout (e.g., to maximize the total number of packages delivered to the delivery locker during a period of time). In examples, the predicted delivery demand 208 and/or the predicted dwell time probability 302 may be variables of the linear programming formulation 400. The linear programming function 400 may include various other indices, parameters, variables, and equations, as illustrated in FIG. 4.

At block 508, the process 500 may include receiving a request to deliver a package to the delivery locker including a selected delivery speed. For example, as described herein with respect to FIG. 1, the delivery request component 128 may be configured to receive delivery requests from the user 108. The delivery request component 128 may be configured to receive, access, and/or store request data 140 including information relating to a delivery request of the user 108. The request data 140 may include, for example, a selected shipping speed that the user 108 has selected for each package included in the order.

At block 510, the process 500 may include determining, based at least in part on the capacity reservation and the selected delivery speed, an availability associated with a portion of the locker reserved for packages delivered at the selected delivery speed and indicating whether the delivery locker can accommodate the request. For example, as described with respect to FIG. 1, the delivery request component 128 of the capacity management system 102 may be configured to receive and/or access data from the current locker capacity component 126 (e.g., a current and/or predicted number of packages being stored, or that may be stored, in the preferred delivery locker 134 at each shipping speed), the capacity reservation component 122

(e.g., the determined capacity reservation) to determine whether the preferred delivery locker 134 can accommodate the delivery request of the user 108, and/or the delivery request component 128 (e.g., the request data 140 including a selected shipping speed that the user 108 has selected for each package included in the order) to determine whether the preferred delivery locker 134 can accommodate a user 108 request for a package delivery.

For example, the delivery request component 128 may analyze the request data 140 to determine a number of packages at shipping speeds that the user 108 is requesting to be delivered to the preferred delivery locker 134. Utilizing the data from the capacity reservation component 122 indicating a capacity reservation for each ship option of the preferred delivery locker 134, along with the data from the current locker capacity component 126 indicating the current and/or predicted number of packages at each shipping speed that are already in the preferred delivery locker 134 and/or that will be in the preferred delivery locker 134 on the delivery day requested by the user 108, the delivery request component 128 may determine whether the preferred delivery locker 134 can accommodate the user's 102 delivery request for additional packages at the selected ship speed. For example, the delivery request component 128 may determine whether the preferred delivery locker 134 has enough capacity in the portion reserved for packages delivered at the selected ship speed to accommodate the request.

At block 512, the process 500 may include generating, based at least in part on determining that the delivery locker can accommodate the request to deliver the package, a user interface element indicating that the delivery locker can accommodate the request. For example, as described with respect to FIG. 1, the preferred delivery locker component 132 may be configured to generate one or more user interfaces for display on a user device of the user 108. The one or more user interfaces may include one or more user interface elements indicating that the preferred delivery locker 134 can accommodate the delivery request.

FIG. 6 illustrates another example flow diagram corresponding to an example method of the present disclosure. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-5, although the processes may be implemented in a wide variety of other environments, architectures, and systems.

FIG. 6 illustrates another flow diagram of an example process 600 for a capacity management system. The order in which the operations or steps are described is not intended to be construed as a limitation, and any number of the described operations may be combined in any order and/or in parallel to implement process 600.

At block 602, the process 600 may include determining, by a machine learning model, a delivery demand associated with a delivery locker. For example, as described with respect to FIGS. 1 and 2, the delivery demand component 118 may be configured to utilize the capacity management model(s) 202 to determine the predicted delivery demand 208 associated with a delivery locker. In examples, the delivery demand component 118 may also utilize variables such as home deliveries in the same zip code as the preferred delivery locker 134 in the same week of the previous year (e.g., to account for seasonality fluctuations), the time of first rejection for a ship option (e.g., to account for unseen demand), a delivery day of the week, a delivery day of the month, and a ship option. The predicted delivery demand may include an estimated number of packages to be delivered to a delivery locker, such as the preferred delivery locker 134, at individual shipping speeds, on each day of a predetermined period of time, such as the following week.

In examples, the capacity management model(s) 202 may be trained using historical locker data 136 of the preferred delivery locker 134 and/or one or more additional delivery locker(s) 104 and/or historical home delivery data 206. For example, the capacity management model(s) 202 is illustrated as a decision-tree trained model of a random forest classification. However, the machine learning component(s) 124 may execute any type of supervised learning algorithms (e.g., nearest neighbor, Naïve Bayes, Neural Networks, unsupervised learning algorithms, semi-supervised learning algorithms, reinforcement learning algorithms, and so forth).

At block 604, the process 600 may include determining, by the machine learning model, an estimated dwell time probability associated with the one or more packages. For example, as described with respect to FIGS. 1-3, the dwell time probability component 120 may be configured to utilize the capacity management model(s) 202 to determine the predicted dwell time probability 302 associated with a package. In examples, the predicted dwell time probability 302 may indicate an estimated probability that a package to be delivered to a delivery locker, such as the preferred delivery locker 134, will remain in the locker for a certain period of time, such as a number of days after delivery.

In examples the capacity management model(s) 202 may be trained utilizing the historical locker data 136, including historical data associated with the preferred delivery locker 134 and/or one or more additional delivery lockers 104. The historical locker data 136 may include a historical dwell time for packages delivered to the preferred delivery locker 134 and/or the additional locker(s) 104 at individual shipping speeds on individual days of the week during a previous period of time, such as a previous number of weeks, number of months, and the like (e.g., the average, minimum, and maximum dwell time for of packages delivered at a shipping speed and delivered on that day for a previous number of weeks). The dwell time probability component 120 may utilize the capacity management model(s) 202, along with other data such as the ship option selected by the user 108 (e.g., the ship option indicated in the request data 140), the delivery day of the week of the package, and the delivery day of the of the package to predict a dwell time probability for a package to be delivered to a delivery locker, such as the preferred delivery locker 134, at a ship option.

At block 606, the process 600 may include determining, based at least in part on the delivery demand and the estimated dwell time probability, a capacity reservation indicating one or more portions of the delivery locker to reserve for packages delivered at individual delivery speeds. For example, as described herein with respect to FIGS. 1-4, the capacity reservation component 122 may determine a capacity reservation for one or more portions of a delivery locker, such as the preferred delivery locker 134 and/or the additional delivery lockers 104. As described herein, the capacity reservation component 122 may implement a linear programming formulation 400 to optimize the capacity reservations of the preferred delivery locker 134 to maximize throughout (e.g., to maximize the total number of packages delivered to the delivery locker during a period of time). In examples, the predicted delivery demand 208 and/or the predicted dwell time probability 302 may be variables of the linear programming formulation 400.

At block 608, the process 600 may include receiving a request to deliver a package to the delivery lock including a selected delivery speed. For example, as described herein with respect to FIG. 1, the delivery request component 128 may be configured to receive delivery requests from the user 108. The delivery request component 128 may be configured to receive, access, and/or store request data 140 including information relating to a delivery request of the user 108. The request data 140 may include, for example, a selected shipping speed that the user 108 has selected for each package included in the order.

At block 610, the process 600 may include determining whether the delivery locker can accommodate the request. For example, as described with respect to FIG. 1, the delivery request component 128 may be configured to receive and/or access data from various components of the capacity management system 102 to determine whether the preferred delivery locker 134 can accommodate a request from the user 108 for delivery of a package at a selected shipping speed.

For example, the delivery request component 128 may analyze data from the current locker capacity component 126 (e.g., current locker data 138 including an actual number of packages stored in the preferred delivery locker 134 at each shipping speed or a predicted number of packages that may be stored on the requested delivery day), the capacity reservation component 122 (e.g., the determined capacity reservation) to determine whether the preferred delivery locker 134 can accommodate the delivery request of the user 108, and/or the delivery request component 128 (e.g., the request data 140 including a selected shipping speed that the user 108 has selected for each package included in the order).

For instance, the delivery request component 128 may analyze the request data 140 to determine a number of packages at shipping speeds that the user 108 is requesting to be delivered to the preferred delivery locker 134. Utilizing the data from the capacity reservation component 122 indicating a capacity reservation for each ship option of the preferred delivery locker 134, along with the data from the current locker capacity component 126 indicating the current number of packages at each shipping speed that are already in the preferred delivery locker 134 and/or predicted to be in the preferred delivery locker 134 on the requested delivery day, the delivery request component 128 may determine whether the preferred delivery locker 134 has enough capacity in the portion reserved for packages delivered at the selected ship speed to accommodate the request.

If it is determined that the delivery locker can accommodate the request, then at block 612, the process 600 may include generating, based at least in part on determining that the delivery locker can accommodate the request to deliver the package, a user interface element indicating that the delivery locker can accommodate the request. For example, as described with respect to FIG. 1, the preferred delivery locker component 132 may be configured to generate one or more user interfaces for display on a user device of the user 108. The one or more user interfaces may include one or more user interface elements indicating that the preferred delivery locker 134 can accommodate the delivery request.

If, however, it is determined that the delivery locker cannot accommodate the request, then at block 614, the process 600 may include determining an alternative delivery locker that can accommodate the request. For example, as described with respect to FIG. 1, in examples where the preferred delivery locker component 132 cannot accommodate the delivery request (e.g., where the portion reserved for packages of the selected ship speed is full), the delivery request component 128 may further be configured to determine an alternative delivery locker from the additional delivery lockers 104 that can accommodate the request. For example, the delivery request component 128 may be configured to utilize data from the capacity reservation component 122 indicating a capacity reservation for each ship option of the additional delivery lockers 104, along with the data from the current locker capacity component 126, indicating the actual and/or predicted number of packages at each shipping speed associated with the additional delivery lockers 104, to determine an alternative delivery locker that can accommodate the user's 102 delivery request.

Further, at block 616, the process 600 may include generating an additional user interface element indicating the alternative delivery locker. For example, as described with respect to FIG. 1, the preferred delivery locker component 132 may be configured to generate one or more user interfaces for display on a user device of the user 108. The one or more user interfaces may include one or more user interface elements indicating the alternative delivery locker that can accommodate the delivery request. In examples, the user interface may further include one or more selectable elements to allow the user 108 to select the alternative delivery locker. The one or more user interfaces may be displayed via a display component of the user device while the user 108 is placing the request.

While the foregoing disclosure is described with respect to the specific examples, it is to be understood that the scope of the disclosure is not limited to these specific examples. Since other modifications and changes varied to fit particular operating requirements and environments will be apparent to those skilled in the art, the disclosure is not considered limited to the example chosen for purposes of disclosure and covers all changes and modifications which do not constitute departures from the true spirit and scope of this disclosure. Further, although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present disclosure, which is set forth in the following claims.

What is claimed is:

1. A system comprising:
memory;
one or more processors; and
one or more computer-executable instructions stored in the memory and executable by the one or more processors to perform operations comprising:
determining historical data associated with one or more delivery lockers including at least one of a delivery locker or one or more additional delivery lockers, the historical data including at least one of a first number of packages delivered to the one or more delivery lockers at individual delivery speeds during a previous period of time or one or more dwell times associated with the packages delivered to the one or more delivery lockers at the individual delivery speeds during the previous period of time;
providing, to a machine learning model, the historical data;
training the machine learning model based on the historical data to generate a trained machine learning model;
determining, by the trained machine learning model, a delivery demand associated with the delivery locker, the delivery demand indicating an estimated number of packages to be delivered to the delivery locker during a first period of time, the delivery locker configured to store one or more packages delivered at one or more delivery speeds;
determining, by the trained machine learning model, an estimated dwell time probability indicating a probability that the one or more packages will remain in the delivery locker for a second period of time prior to being removed;
determining, based on the delivery demand and the estimated dwell time probability, a capacity reservation indicating a first portion of the delivery locker to reserve for one or more first packages delivered at a first delivery speed of the one or more delivery speeds and a second portion of the delivery locker to reserve for one or more second packages delivered at a second delivery speed of the one or more delivery speeds that is different than the first delivery speed;
receiving a request to deliver a package to the delivery locker, the request indicating an estimated delivery time for the package at the delivery locker during the first period of time and a selected delivery speed of the one or more delivery speeds associated with the package;
determining, based on the capacity reservation, the estimated delivery time, and the selected delivery speed, an availability associated with the first portion of the delivery locker or the second portion of the delivery locker reserved for packages delivered at the selected delivery speed, the availability indicating whether the delivery locker can accommodate the request to deliver the package;
generating, based on determining that the delivery locker can accommodate the request to deliver the package, a user interface element indicating that the delivery locker can accommodate the request to deliver the package;
determining at least one of an actual number of packages delivered to the delivery locker during the first period of time or an actual dwell time that the one or more packages remained in the delivery locker prior to being removed; and
comparing at least one of the actual number of packages to the estimated number of packages to determine a first accuracy of the estimated number of packages or comparing the actual dwell time to the second period of time to determine a second accuracy of the second period of time.

2. The system of claim 1, wherein the delivery demand further indicates the estimated number of packages delivered to the delivery locker at the individual delivery speeds on individual days of the first period of time.

3. The system of claim 1, wherein the previous period of time comprises a first period of time, and where the historical data further includes a second number of packages delivered to delivery locations of users at the individual delivery speeds during a second previous period of time.

4. The system of claim 3, wherein the historical data includes at least one of the first number of packages delivered to the one or more delivery lockers or the second number of packages delivered to the delivery locations.

5. The system of claim 3, wherein the historical data includes the one or more dwell times associated with the packages delivered to the one or more delivery lockers at the individual delivery speeds during the previous period of time.

6. The system of claim 1, the operations further comprising:
determining, prior to determining that the delivery locker can accommodate the request to deliver the package, that a second delivery locker cannot accommodate the request to deliver the package;
identifying, based on determining that the second delivery locker cannot accommodate the request to deliver the package, the delivery locker; and
receiving user input indicating a selection of the delivery locker.

7. The system of claim 1, wherein the one or more delivery lockers include a preferred delivery locker having a first characteristic or one or more similar delivery lockers having a second characteristic that is determined to be similar to the first characteristic, and wherein training the machine learning model comprises training the machine learning model based on preferred historical data associated with the preferred delivery locker or based on similar historical data associated with the one or more similar delivery lockers.

8. A method comprising:
determining historical data associated with packages delivered to, and stored within, one or more delivery lockers including a delivery locker or one or more additional delivery lockers;
training a machine learning model based at least in part on the historical data to generate a trained machine learning model;
determining, by the trained machine learning model, a delivery demand associated with the delivery locker configured to store one or more packages delivered at one or more delivery speeds;
determining, by the trained machine learning model, an estimated dwell time probability indicating a probability that the one or more packages will remain in the delivery locker for a period of time;
determining, based at least in part on the delivery demand and the estimated dwell time probability, a capacity reservation associated with a first delivery speed of the one or more delivery speeds and a second delivery speed of the one or more delivery speeds, the second delivery speed being different than the first delivery speed, and the capacity reservation indicating a first portion of the delivery locker to reserve for a first package delivered at the first delivery speed and a second portion of the delivery locker to reserve for a second package delivered at the second delivery speed;

reserving the first portion of the delivery locker or the second portion of the delivery locker according to the capacity reservation; and at least one of:
   determining a first accuracy of the delivery demand based at least in part on an actual number of the one or more packages delivered to the delivery locker; or
   determining a second accuracy of the estimated dwell time based at least in part on an actual dwell time associated with the one or more packages and the delivery locker.

9. The method of claim 8, wherein the historical data includes at least one of:
   a first number of the packages delivered to the one or more delivery lockers at individual delivery speeds of the one or more delivery speeds during a previous period of time; or
   dwell times associated with the packages delivered to the one or more delivery lockers at the individual delivery speeds during the previous period of time.

10. The method of claim 9, wherein the previous period of time comprises a first period of time, and where the historical data further includes a second number of packages delivered to delivery locations of users at the individual delivery speeds during a second previous period of time.

11. The method of claim 10, wherein determining the delivery demand associated with the delivery locker comprises:
   providing, to the machine learning model, the historical data including at least one of the first number of packages delivered to the one or more delivery lockers or the second number of packages delivered to the delivery locations; and
   predicting, by the trained machine learning model, the delivery demand.

12. The method of claim 10, wherein determining the estimated dwell time probability comprises:
   providing, to the trained machine learning model, the historical data including the dwell times associated with the packages delivered to the one or more delivery lockers at the individual delivery speeds during the previous period of time; and
   predicting, by the trained machine learning model, the estimated dwell time probability.

13. The method of claim 8, further comprising:
   receiving a request to deliver a package to the delivery locker, the request indicating a selected delivery speed of the one or more delivery speeds associated with the package;
   determining, based at least in part on the capacity reservation and the selected delivery speed, an availability associated with the first portion or the second portion, the availability indicating whether the delivery locker can accommodate the request to deliver the package; and
   generating, based at least in part on determining that the delivery locker can accommodate the request to deliver the package, a user interface element indicating that the delivery locker can accommodate the request.

14. The method of claim 8, further comprising:
   receiving a request to deliver a package to the delivery locker, the request indicating a selected delivery speed of the one or more delivery speeds associated with the package;
   determining, based at least in part on the capacity reservation and the selected delivery speed, an availability associated with the first portion or the second portion, the availability indicating whether the delivery locker can accommodate the request to deliver the package;
   determining, based at least in part on determining that the delivery locker cannot accommodate the request to deliver the package, an alternative delivery locker that can accommodate the request to deliver the package;
   generating a user interface element identifying the alternative delivery locker and configured to receive user input; and
   receiving user input indicating a selection of the alternative delivery locker.

15. The method of claim 8, wherein the delivery demand indicates an estimated number of packages to be delivered to the delivery locker at individual delivery speeds of the one or more delivery speeds on individual days during a predetermined period of time.

16. A method comprising:
   determining historical data associated with a plurality of packages delivered to, and stored within, one or more delivery lockers;
   training a machine learning model utilized in association with the one or more delivery lockers based at least in part on the historical data to generate a trained machine learning model;
   determining, by the trained machine learning model, an estimated number of packages to be delivered to a delivery locker of the plurality of delivery lockers at one or more delivery speeds;
   determining, by the trained machine learning model, an estimated dwell time probability indicating a probability that the one or more packages will remain in the delivery locker for a period of time;
   determining, based at least in part on the estimated number of packages and the estimated dwell time probability, a first portion of the delivery locker to reserve for one or more first packages delivered at a first delivery speed of the one or more delivery speeds and a second portion of the delivery locker to reserve for one or more second packages delivered at a second delivery speed of the one or more delivery speeds that is different than the first delivery speed;
   receiving a request to deliver a first package to the delivery locker at a first selected delivery speed of the one or more delivery speeds and to deliver a second package to the delivery locker at a second selected delivery speed of the one or more delivery speeds;
   determining, based at least in part on the request, the first selected delivery speed, and the second selected delivery speed, whether the delivery locker can accommodate the request to deliver the package; and
   at least one of:
      determining a first accuracy of the delivery demand based at least in part on an actual number of the packages delivered to the delivery locker; or
      determining a second accuracy of the estimated dwell time based at least in part on an actual dwell time associated with the packages and the delivery locker.

17. The method of claim 16, further comprising at least one of:

generating, based at least in part on determining that the delivery locker can accommodate the request to deliver the package, a first user interface element indicating that the delivery locker can accommodate the request to deliver the package; or generating, based at least in part on determining that the delivery locker cannot accommodate the request to deliver the package, a second user interface element identifying an alternative delivery locker that can accommodate the request to deliver the package.

18. The method of claim 16, wherein the historical data includes at least one of:

a first number of packages delivered to the one or more delivery lockers at the individual delivery speeds during a previous period of time; or a dwell time associated with the packages delivered to the one or more delivery lockers at the individual delivery speeds during the previous period of time, wherein determining at least one of the estimated number of packages or the estimated dwell time probability is based at least in part on the historical data.

19. The method of claim 18, wherein the previous period of time comprises a first period of time, and where the historical data further includes a second number of packages delivered to residences at the individual delivery speeds during a second previous period of time.

20. The method of claim 19, wherein determining the estimated number of packages and the estimated dwell time probability comprises:

providing, to the machine learning model, the historical data; and predicting, by the trained machine learning model, the estimated number of packages and the estimated dwell time probability.

\* \* \* \* \*